United States Patent
Nezu

(10) Patent No.: US 9,081,483 B2
(45) Date of Patent: Jul. 14, 2015

(54) NAVIGATION APPARATUS AND NAVIGATION APPARATUS DISPLAY METHOD

(71) Applicant: Sony Corporation, Tokyo (JP)

(72) Inventor: Yoshiyuki Nezu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/902,461

(22) Filed: May 24, 2013

(65) Prior Publication Data

US 2013/0263051 A1    Oct. 3, 2013

Related U.S. Application Data

(63) Continuation of application No. 12/275,542, filed on Nov. 21, 2008, now Pat. No. 8,479,120.

(30) Foreign Application Priority Data

Dec. 26, 2007  (JP) ................. 2007-333537

(51) Int. Cl.
   *G06F 3/048*     (2013.01)
   *G06F 3/0482*    (2013.01)
   *G01C 21/36*     (2006.01)

(52) U.S. Cl.
   CPC .......... *G06F 3/0482* (2013.01); *G01C 21/3611* (2013.01); *G01C 21/3614* (2013.01); *G01C 21/3664* (2013.01)

(58) Field of Classification Search
   None
   See application file for complete search history.

(56) References Cited

U.S. PATENT DOCUMENTS

| | | | |
|---|---|---|---|
| 5,581,243 A * | 12/1996 | Ouellette et al. | 345/173 |
| 5,726,688 A | 3/1998 | Siefert et al. | |
| 5,784,059 A | 7/1998 | Morimoto et al. | |
| 6,028,604 A * | 2/2000 | Matthews et al. | 715/821 |
| 6,275,231 B1 | 8/2001 | Obradovich | |
| 6,415,224 B1 | 7/2002 | Wako et al. | |
| 6,484,094 B1 | 11/2002 | Wako | |
| 6,653,948 B1 | 11/2003 | Kunimatsu et al. | |
| 6,999,875 B2 | 2/2006 | Tu | |
| 7,035,720 B2 | 4/2006 | Taxis | |
| 7,154,473 B2 * | 12/2006 | Kim | 345/157 |

(Continued)

FOREIGN PATENT DOCUMENTS

CN     1668893 A     9/2005
CN     200979593 A   11/2007

(Continued)

OTHER PUBLICATIONS

U.S. Appl. No. 13/887,162, filed May 3, 2013, Nezu, et al.

(Continued)

*Primary Examiner* — Stephen Alvesteffer
(74) *Attorney, Agent, or Firm* — Oblon, McClelland, Maier & Neustadt, L.L.P.

(57) ABSTRACT

Disclosed herein is a navigation apparatus for displaying maps on a display section based on map data held in a recording section, the navigation apparatus including: a current position detection section configured to detect the current position of the navigation apparatus; a touch-sensitive panel configured to be installed on a display screen of the display section; and a control section configured to control changes in what is displayed on the display section in response to operations performed by a user on the touch-sensitive panel.

16 Claims, 8 Drawing Sheets

(56) References Cited

U.S. PATENT DOCUMENTS

| | | |
|---|---|---|
| 7,171,243 B2 | 1/2007 | Watanabe et al. |
| 8,271,193 B2 | 9/2012 | Nezu |
| 8,289,283 B2 * | 10/2012 | Kida et al. .................... 345/173 |
| 8,458,618 B2 | 6/2013 | Nezu et al. |
| 2002/0105549 A1 | 8/2002 | Yokota |
| 2002/0169547 A1 | 11/2002 | Harada |
| 2002/0196268 A1 * | 12/2002 | Wolff et al. .................... 345/718 |
| 2003/0018427 A1 | 1/2003 | Yokota et al. |
| 2003/0216861 A1 * | 11/2003 | Sakata ........................... 701/211 |
| 2005/0120312 A1 * | 6/2005 | Nguyen ......................... 715/863 |
| 2005/0183037 A1 | 8/2005 | Kuenzner |
| 2005/0210408 A1 | 9/2005 | Baranda |
| 2005/0267676 A1 | 12/2005 | Nezu et al. |
| 2006/0173615 A1 | 8/2006 | Pinkus et al. |
| 2006/0190843 A1 | 8/2006 | Takashima et al. |
| 2007/0174788 A1 * | 7/2007 | Ording ........................... 715/816 |
| 2007/0265772 A1 | 11/2007 | Geelen |
| 2008/0052627 A1 | 2/2008 | Oguchi |
| 2008/0066007 A1 | 3/2008 | Lau et al. |
| 2008/0163116 A1 | 7/2008 | Lee et al. |
| 2009/0210153 A1 | 8/2009 | Listle et al. |

FOREIGN PATENT DOCUMENTS

| | | |
|---|---|---|
| JP | 2006-256599 | 9/2006 |
| JP | 2007-219097 | 8/2007 |
| JP | 2007-276615 | 10/2007 |

OTHER PUBLICATIONS

U.S. Appl. No. 13/887,175, filed May 3, 2013, Nezu, et al.

Chinese Office Action w/English translation, dated Jul. 4, 2011, in related application JP200810185590.4.

* cited by examiner

NAVIGATION APPARATUS AND NAVIGATION APPARATUS DISPLAY METHOD

CROSS REFERENCES TO RELATED APPLICATIONS

This application is a continuation of application Ser. No. 12/275,542, filed Nov. 21, 2008, which claims the benefit of priority of Japanese Patent Application JP 2007-333537 filed on Dec. 26, 2007, the entire contents of each is being incorporated herein by reference.

BACKGROUND OF THE INVENTION

1. Field of the Invention

The present invention relates to a navigation apparatus and a navigation apparatus display method. More particularly, the invention relates to a navigation apparatus and a navigation apparatus display method applicable illustratively to personal navigation devices (PND) and capable of displaying menus in such a manner that the display of menus of high importance and the display of all menus can be switched in response to map-based user operations.

2. Description of the Related Art

Usually, navigation devices display various menus and accept the input of destinations and other settings in response to the user's operations. With regard to the display of menus, Japanese Patent Laid-Open No. 2006-256599 illustratively discloses a structure for allowing menus to be changed by operation of rotary controls.

On the display screen of a limited size such as that of navigation devices, numerous selectable menus could at once be displayed using a touch-sensitive panel. This, however, would make it difficult to display other information on the screen. In particular, the navigation device could be arranged to display a large number of selectable menus through a touch-sensitive panel, but that would hamper the display of maps on the same screen for verification of destinations or stopovers. As a result, map-based operations are difficult to perform, and the ease of operation is reduced accordingly.

SUMMARY OF THE INVENTION

The present invention has been made in view of the above circumstances and provides a navigation apparatus and a navigation apparatus display method for displaying diverse menus in a manner allowing map-based operations to be carried out.

In carrying out the present invention and according one embodiment thereof, there is provided a navigation apparatus for displaying maps on a display section based on map data held in a recording section, the navigation apparatus including: a current position detection section configured to detect the current position of the navigation apparatus; a touch-sensitive panel configured to be installed on a display screen of the display section; and a control section configured to control changes in what is displayed on the display section in response to operations performed by a user on the touch-sensitive panel. In the navigation apparatus, the control section causes the display section to display a main menu on which to designate the display of a map and a plurality of menus. In the navigation apparatus, if the main menu is selected through the touch-sensitive panel, then the control section causes the display section to display either the plurality of menus and a first menu display changing menu; or the menus of high importance from the plurality of menus, a second menu display changing menu and the map. If the first menu display changing menu is selected through the touch-sensitive panel, then the control section causes the display section to replace the display of the plurality of menus and the first menu display changing menu with the display of the menus of high importance, the second menu display changing menu and the map. If the second menu display changing menu is selected through the touch-sensitive panel, then the control section causes the display section to replace the display of the menus of high importance, the second menu display changing menu and the map with the display of the plurality of menus and the first menu display changing menu.

According to another embodiment of the present invention, there is provided a navigation apparatus display method for use with a navigation apparatus for displaying maps on a display section based on map data held in a recording section. The navigation apparatus includes: a current position detection section configured to detect the current position of the navigation apparatus; and a touch-sensitive panel configured to be installed on a display screen of the display section. The navigation apparatus display method includes the steps of: causing the display section to display a main menu on which to designate the display of a map and a plurality of menus; if the main menu is selected through the touch-sensitive panel, then causing the display section to display either the plurality of menus and a first menu display changing menu; or the menus of high importance from the plurality of menus, a second menu display changing menu and the map; if the first menu display changing menu is selected through the touch-sensitive panel, then causing the display section to replace the display of the plurality of menus and the first menu display changing menu with the display of the menus of high importance, the second menu display changing menu and the map; and if the second menu display changing menu is selected through the touch-sensitive panel, then causing the display section to replace the display of the menus of high importance, the second menu display changing menu and the map with the display of the plurality of menus and the first menu display changing menu.

Where the present invention is embodied as outlined above, the embodiment permits the displaying of various menus on the display screen in response to map-based operations by the user in such a manner that a sufficiently wide screen display area is allocated for map display and that the display of the menus of high importance and the display of all menus may be changed as desired.

BRIEF DESCRIPTION OF THE DRAWINGS

Further features and advantages of the present invention will become apparent upon a reading of the following description and appended drawings in which.

DETAILED DESCRIPTION OF THE PREFERRED EMBODIMENTS

The preferred embodiments of the present invention will now be described in detail with reference to the accompanying drawings.

First Embodiment

(1) Structure of the Embodiment

Figure 2:
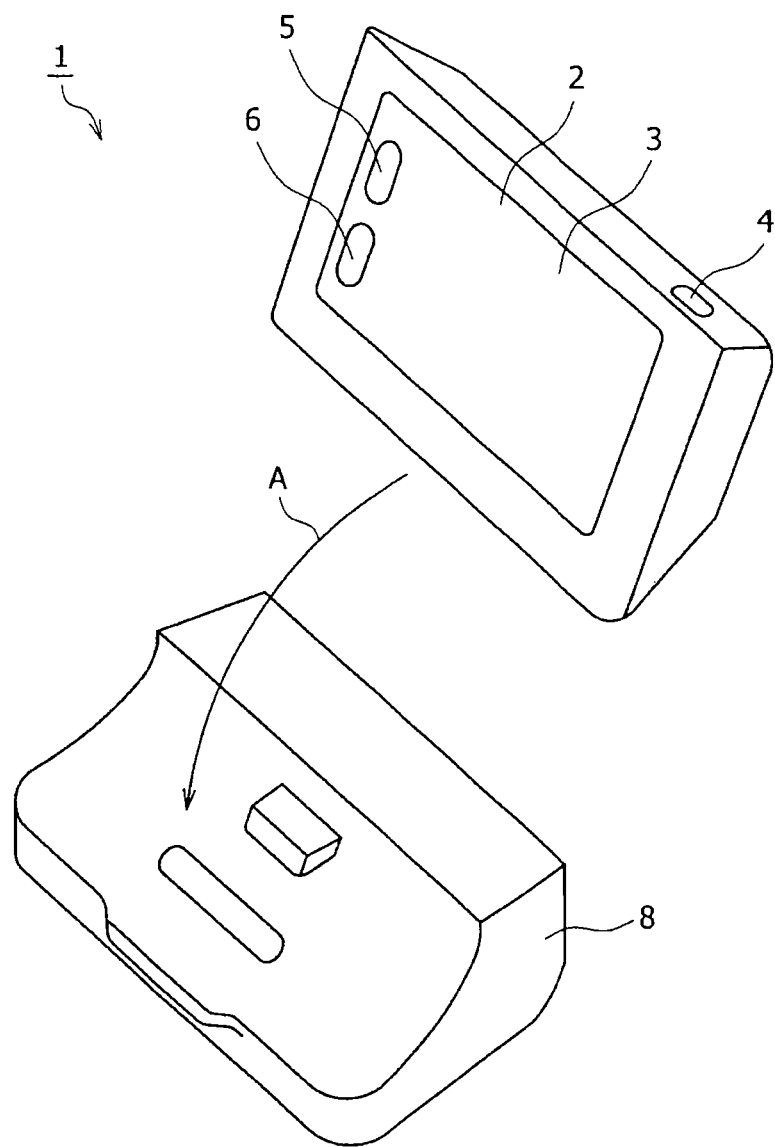
FIG. 2 is a perspective view illustrating the navigation apparatus embodying the invention.

FIG. 2 is a perspective view illustrating a navigation apparatus 1 embodying the present invention. This navigation apparatus 1 is a personal navigation device (PND) that displays maps showing the current position in response to the user's operations and thereby guides the user to a desired destination. The navigation apparatus 1 has on its front a display screen 2 that displays maps and various menus. The front surface of the display screen 2 is provided with a touch-sensitive panel 3 that detects the user's operations performed thereon. Speakers are furnished on the sides of the navigation apparatus 1. A power switch 4 is located on the top edge of the navigation apparatus 1. The left-hand side of the display screen 2 is furnished with a menu button 5 used to designate menu display and a current position button 6 used to specify display of the current position.

Operating on internal batteries, the navigation apparatus 1 may be handled in portable fashion. As indicated by an arrow A, the navigation apparatus 1 is structured to be set on a cradle 8 for use on board a vehicle. The cradle 8, fastened onto the dashboard or other suitable part of the vehicle, holds the navigation apparatus 1 removably from below. When placed on the cradle 8, the navigation apparatus 1 taps its power from the cradle 8 for operation purposes.

Figure 3:
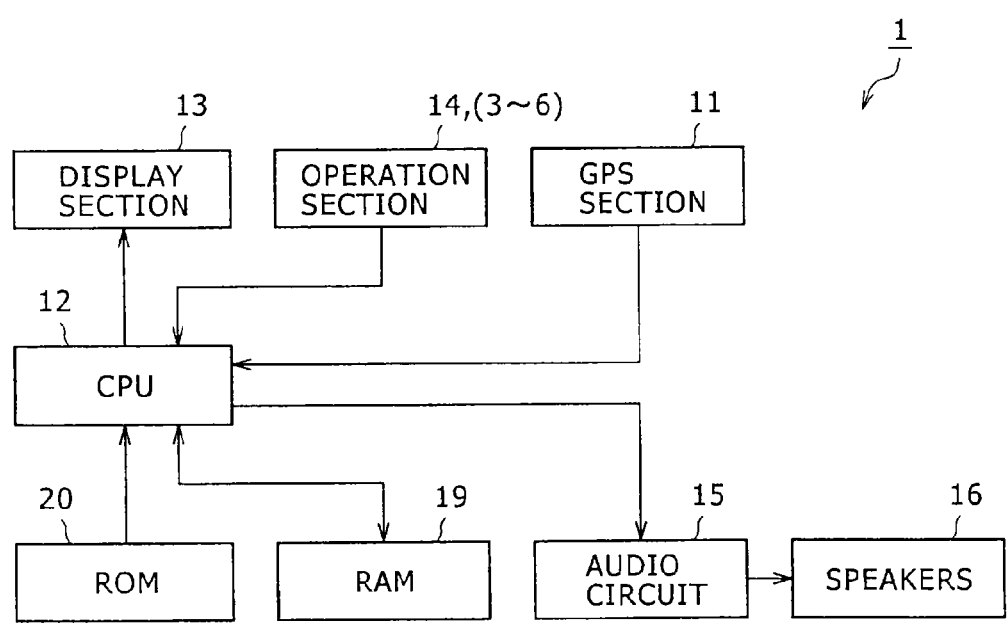
FIG. 3 is a block diagram showing a typical structure of the navigation apparatus embodying the invention.

FIG. 3 is a block diagram showing a typical structure of the navigation apparatus 1. A GPS (global positioning system) section 11 constitutes a current position detection section that detects the current position. The GPS section 11 receives radio waves from GPS satellites, detects the current position therefrom, and informs a CPU (central processing unit) 12 of the detected position.

A display section 13 is typically made up of a TFT-LCD (thin film transistor-liquid crystal display) panel that constitutes the display screen 2 discussed above in reference to FIG. 2. The display section 13 displays maps and various operation menus under control of the CPU 12.

An operation section 14 is formed by the touch-sensitive panel 3, power switch 4, menu button 5, and current position button 6. The user's operations made on these controls are detected by the operation section 14 and conveyed to the CPU 12.

An audio circuit 15 processes audio data coming from the CPU 12 and outputs the resulting audio signal to drive the speakers 16. A random access memory (RAM) 19 provides a work area for the CPU 12. A read-only memory (ROM) 20 retains the programs to be executed by the CPU 12 as well as map data needed by the CPU 12 for program execution. The programs and various data to be held in the ROM 20 are offered preinstalled in the navigation apparatus 1. Alternatively, the programs and data may be distributed recorded on suitable recording media such as optical disks, magnetic disks or memory cards. As another alternative, the programs and data may be downloaded over suitable networks such as the Internet.

The CPU 12 is a control section that controls the overall performance of the navigation apparatus 1. With its work area allocated in the RAM 19, the CPU 12 carries out the programs held in the ROM 20 so as to control the workings of the navigation apparatus 1 as a whole.

In response to an operation on the power switch 4, the CPU 12 initiates program execution and starts up the entire apparatus 1. Operating the menu button 5 causes the CPU 12 to display a top menu screen that includes a destination input menu and a menu for reproducing audio and video data. If the audio/video data reproduction menu is selected from the top menu screen, the CPU 12 reproduces audio/video data from a memory card, not shown, and offers what is being reproduced to the user. If the destination input menu is selected, the CPU 12 receives input of information for identifying the desired destination such as the telephone number and address and proceeds to carry out a route search process. The CPU 12 then starts effecting a route guidance process using route information derived from the route search and from the current position information acquired by the GPS section 11.

Operating the current position button 6 prompts the CPU 12 to display a map showing the current position on the display screen 2. The CPU 12 may also accept input of the destination in response to the user's operations on the map display and start the route guidance process. With the route guidance process started, the CPU 12 causes the display screen 2 to display the map of the current position and to give route directions including text and voice announcements.

Figure 4A:
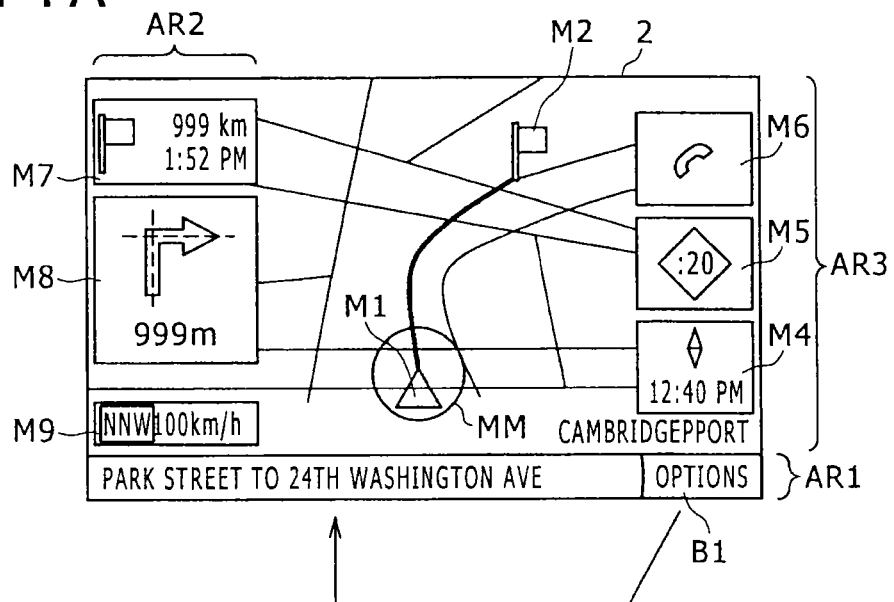
FIGS. 4A and 4B are plan views showing how display screens appear on the navigation apparatus embodying the invention.
Figure 4B:
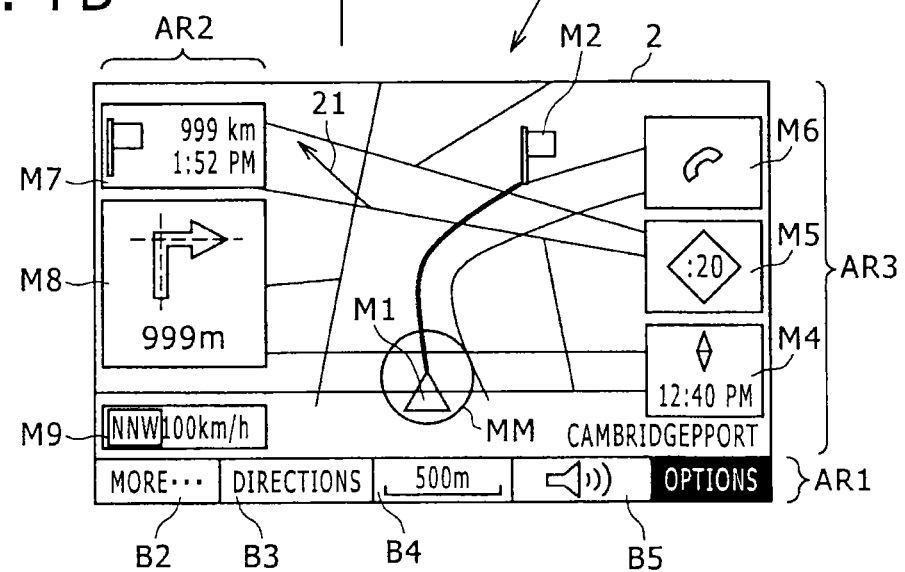

FIGS. 4A and 4B are plan views showing what the display screen 2 typically displays while the route guidance process is underway. The CPU 12 establishes a text display area AR1 on an edge of the screen. With this embodiment, the text display area AR1 is allocated along the bottom edge of the display screen. The CPU 12 sets up an approach-to-destination information display area AR2 on the left-hand side of the screen. The remaining screen area AR3 is set aside as a map display area.

In the map display area AR3, the CPU 12 displays a map covering the current position detected by the GPS section 11. The map shows a marker M1 pointing to the current position and a marker M2 indicating the destination. On this map display, the CPU 12 shows the roads detected as the route in a color different from the colors of the other roads. The approximate center of the screen is encircled by a circular mark MM indicating a focal position. On the right-hand side of the map display area AR3 are a mark M4 showing a compass indicating in which direction the vehicle is advancing, a mark M5 indicating the number of the route the vehicle is traveling, and a mark M6 indicating that this is an area where the mobile phone can be used.

In the approach-to-destination information display area AR2, the CPU 12 gives an indication M7 showing the distance (e.g., 999 km) and time (e.g., 1.52 PM) to the destination, an indication M8 showing the distance (e.g., 999 m) and the route to the next turn, and an indication M9 showing the current advancing direction (e.g., NNW) and driving speed (e.g., 100 km/h).

At factory defaults, the CPU 12 displays in text form the name of the current position and route directions in the text display area AR1 as shown in FIG. 4A. In the example of FIG. 4A, the indication "Park Street to 24th Washington Ave" shows that the street the vehicle is currently traveling is named "Park Street" and that the street to be traveled next is named "24th Washington Ave." To the right of the text display area AR1, the CPU 12 displays an option menu B1 used to designate the display of various operation menus.

If the user operates the current position button 6 without the route guidance process being underway, the CPU 12 displays the map of the current position such as one shown in FIG. 4A. In this case, the text display area AR1 shows only the name of the current position and the indications M7 and M8 related to the destination do not appear because the route guidance process is not performed.

At factory defaults, the CPU 12 displays the map so that the current position appears just below the center position of the map display area AR3 with or without the route guidance process being carried out. When the user slides his or her fingertips over the touch-sensitive panel 3 as indicated by an arrow 21, the CPU 12 scrolls the map display in the direction in which the fingertips have moved. If the user operates the current position button 6 while the map is being scrolled, the map display is returned to its default state. When the user slides the fingertips starting from the middle of the circular mark MM, the display position of the mark MM is moved in the direction in which the fingertips have moved. Thereafter, the map is scrolled in such a manner that the mark MM appears at the approximate center of the display screen.

If the option menu B1 is detected to be selected from the text display area AR1 through the touch-sensitive panel 3, the CPU 12 replaces the text display of the current position name and route directions with operation menus B2 through B5 as indicated by an arrow B. The CPU 12 further changes the display color of the option menu B1 to inform the user that the option menu B1 is being selected.

If no operation is detected for a predetermined time period on the touch-sensitive panel 3 while the operation menus B2 through B5 are being displayed, the CPU 12 returns the text display area AR1 to its original display as indicated by an arrow C.

Figure 5A:
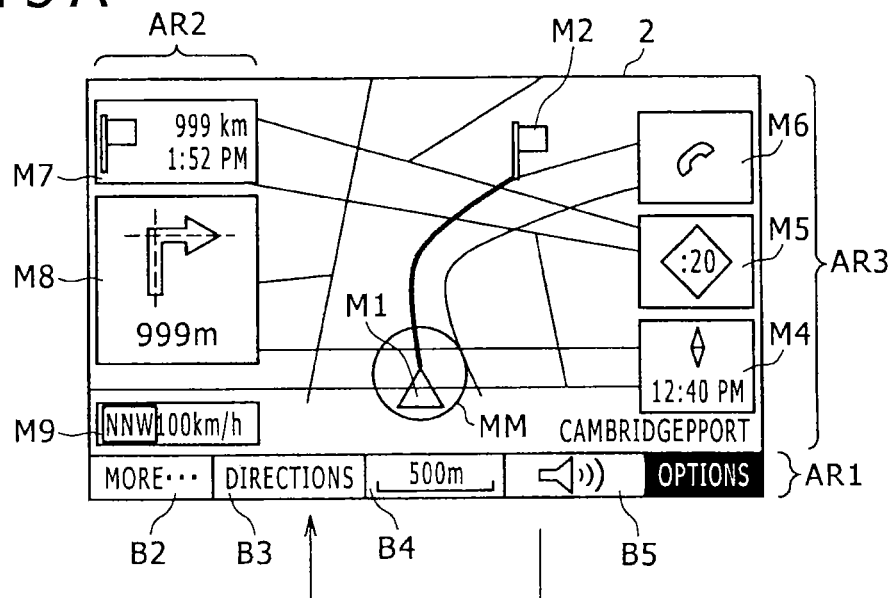
FIGS. 5A and 5B are plan views continued from the illustrations of FIGS. 4A and 4B.
Figure 5B:
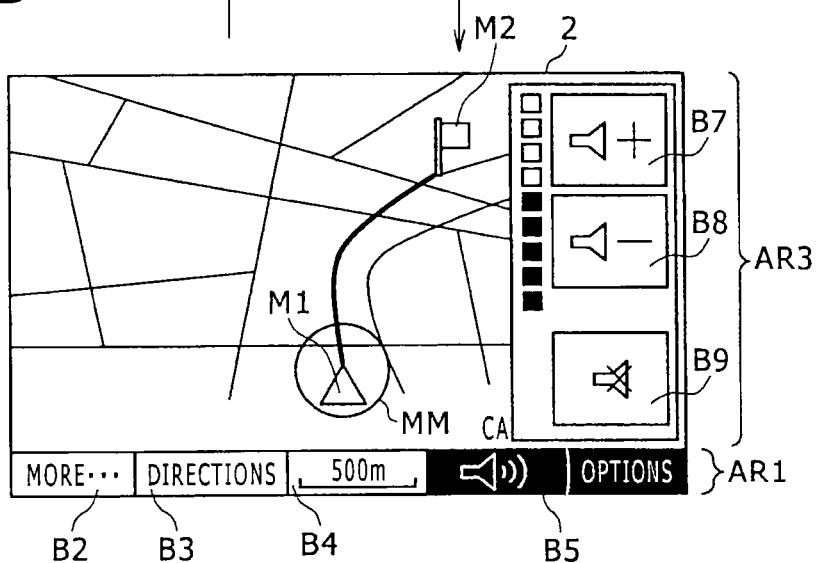

Of the operation menus B2 through B5, the rightmost menu B5 is a speaker volume control menu. Selecting the menu B5 causes the CPU 12 to change the display screen 2 to a volume control display as indicated by an arrow D in FIGS. 5A and 5B. On the volume control display, the area other than the text display area AR1 is allocated for map display (FIG. 5B). On the rightmost edge of the map display area appear a menu B7 used to designate an increase in volume, a menu B8 used to specify a drop in volume, and a menu B9 for muting the volume. To the left of the menus B7 through B9 appears a bar chart indicator graphically indicating the current volume level.

When selections of the menus B7 through B9 are detected through the touch-sensitive panel 3, the CPU 12 varies the volume by suitably controlling the audio circuit 15 and changes the bar chart indicator accordingly. If no operation is detected for a predetermined time period on the touch-sensitive panel 3 while the volume control display is on, the CPU 12 restores the original display as indicated by an arrow E.

Figure 6A:
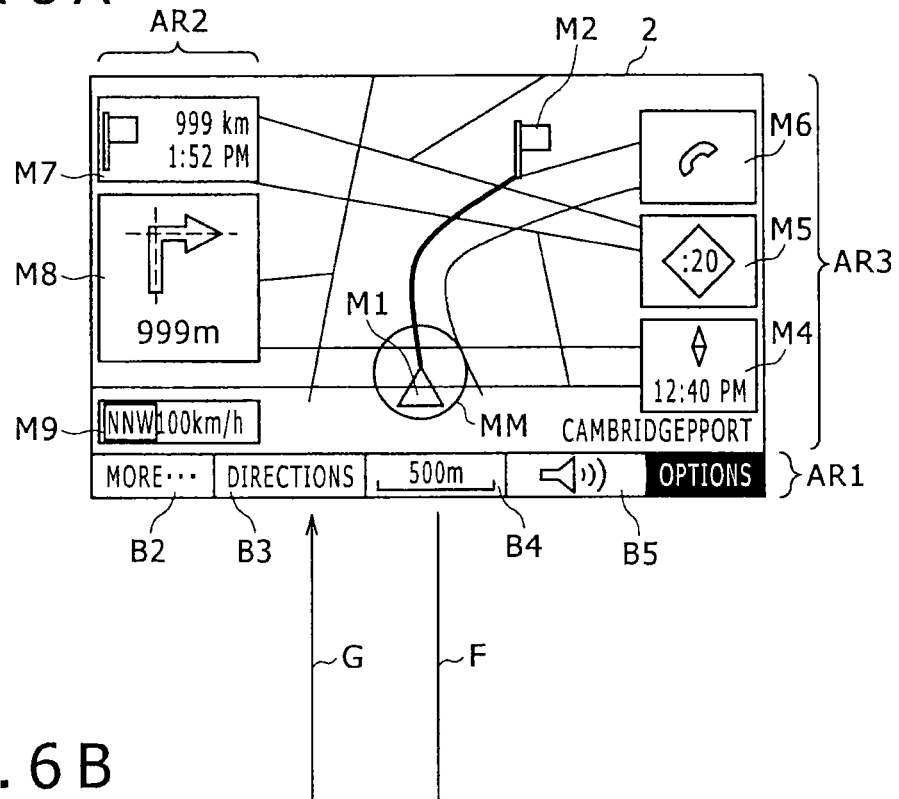
FIGS. 6A and 6B are plan views continued from the illustrations of FIGS. 5A and 5B.
Figure 6B:
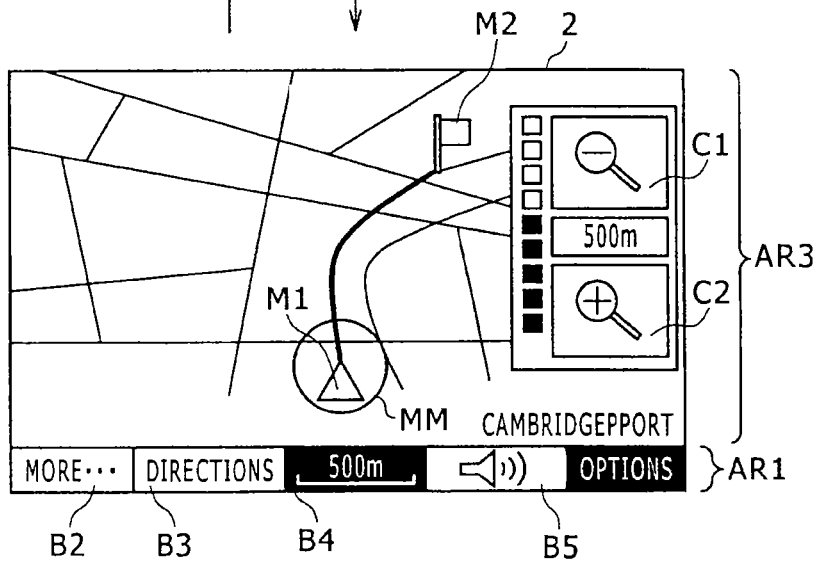

Of the operation menus B2 through B5, the menu B4 (FIG. 4B) to the left of the menu B5 is a scale changing menu that indicates a rule-of-thumb distance unit on the current scale over the map along with a map length indication representative of the distance unit. Selecting the menu B4 prompts the CPU 12 to change the display screen 2 to a scale changing display as indicated by an arrow F in FIGS. 6A and 6B. On the scale changing display, as in the case of the volume control display, the area other than the text display area AR1 is allocated for map display (FIG. 6B). On the rightmost edge of the map display area appear a menu C1 used to zoom out the map and a menu C2 used to zoom in the map. To the left of the menus C1 and C2 appears a bar chart indicator graphically indicating the current map scale.

When selections of the menus C1 and C2 are detected through the touch-sensitive panel 3, the CPU 12 varies the map scale and changes the bar chart indicator accordingly. If no operation is detected for a predetermined time period on the touch-sensitive panel 3 while the scale changing display is on, the CPU 12 restores the original display as indicated by an arrow G.

If the user slides his or her fingertips on the map while the volume control display or scale changing display is on, the CPU 12 also shifts the map and mark MM in the direction in which the fingertips have moved.

Figure 7A:
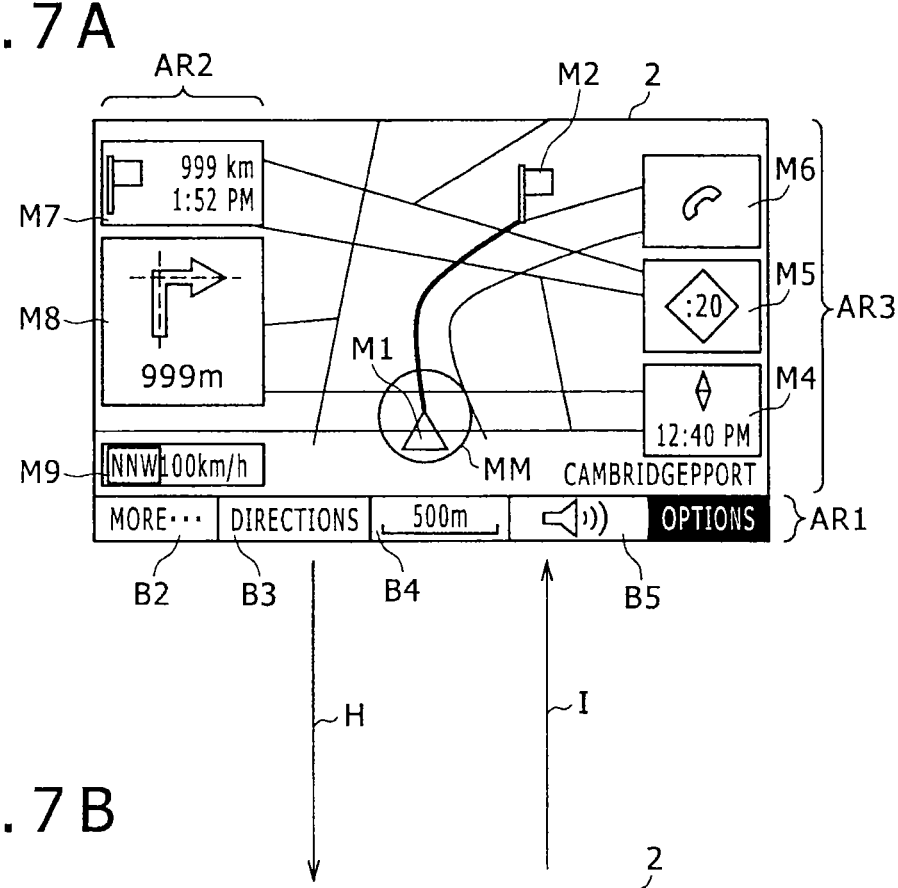
FIGS. 7A and 7B are plan views continued from the illustrations of FIGS. 6A and 6B.
Figure 7B:
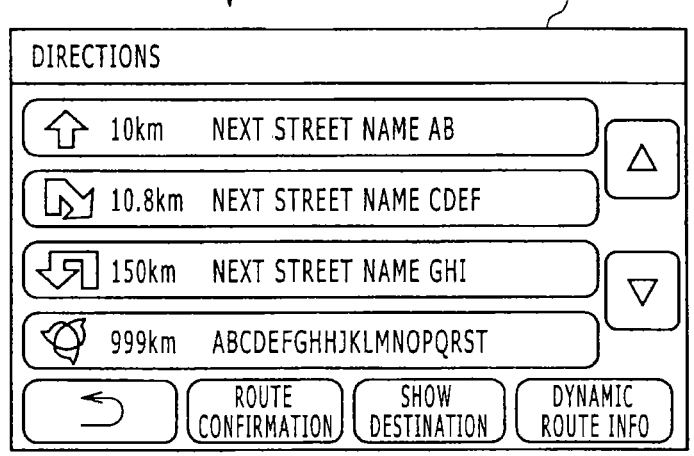

Of the operation menus B2 through B5, the menu B3 (FIG. 4B) to the left of the menu B4 is a route direction display designating menu. Selecting the menu B3 causes the CPU 12 to change the display screen 2 to a route direction display as indicated by an arrow H in FIGS. 7A and 7B. On the map display with the route guidance process turned off, the menu B3 is grayed out to show that it is not selectable.

The route direction display taking up almost all the display screen shows successively stopovers and distances to the destination starting from the current position together with route directions along the way. On the right-hand side of the display appear marks used to scroll the screen. At the bottom of the screen are various menus for editing the route.

When the scroll marks are operated selectively on the route direction display, the CPU 12 scrolls the route direction display accordingly. If one of the editing menus is selected, the CPU 12 changes the display screen to the corresponding editing menu display through which to accept route changes. If the menu for restoring the original display is selected, the CPU 12 replaces the route direction display with the original display as indicated by an arrow I.

Of the operation menus B2 through B5, the leftmost menu B2 (FIG. 4B) is a menu for opening other menus. Selecting the menu B2 prompts the CPU 12 to display a menu screen through which to designate route guidance settings and changes. The menus shown on this menu screen are divided into two categories: menus of high importance and those of low importance. In this example, the menus of high importance are made up of a menu C3 for accepting input of the destination, a menu C4 for designating entries into the address book, and a menu C5 for stopping the route guidance. Some of these menus require carrying out confirmations on the map (FIG. 1B). The menus of low importance are formed by a menu C7 for accepting input of route changes through a block-by-block route display and a menu C8 for displaying candidate routes to choose from for guidance (FIG. 1C). These are the menus that do not require confirmations on the map.

Figure 1A:
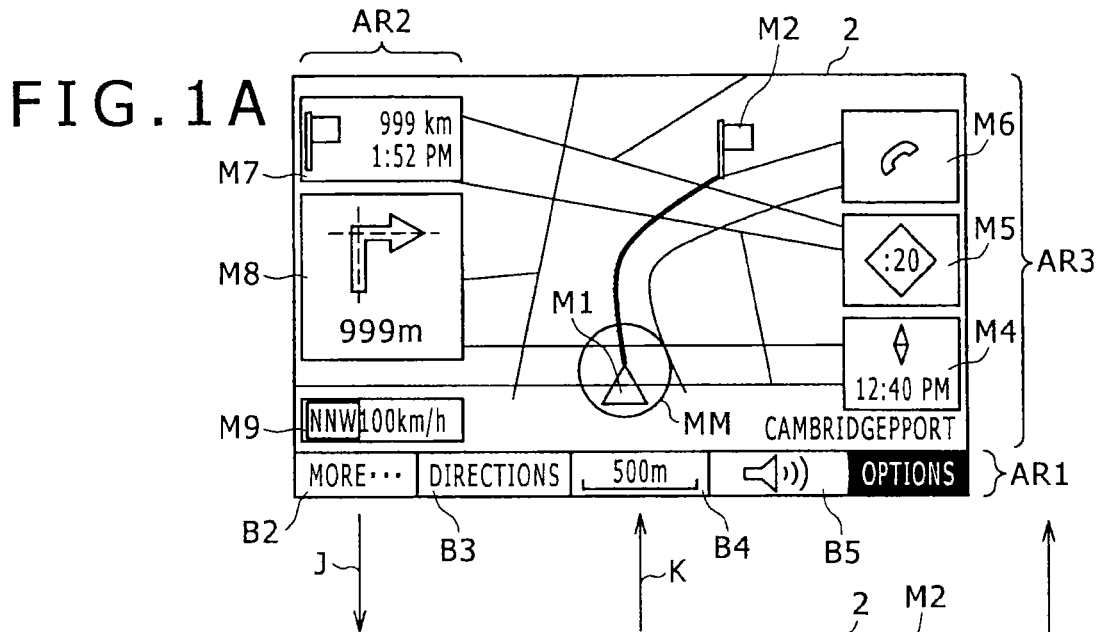
FIGS. 1A, 1B and 1C are plan views showing how display screens are typically changed on a navigation apparatus embodying the present invention.
Figure 1B:
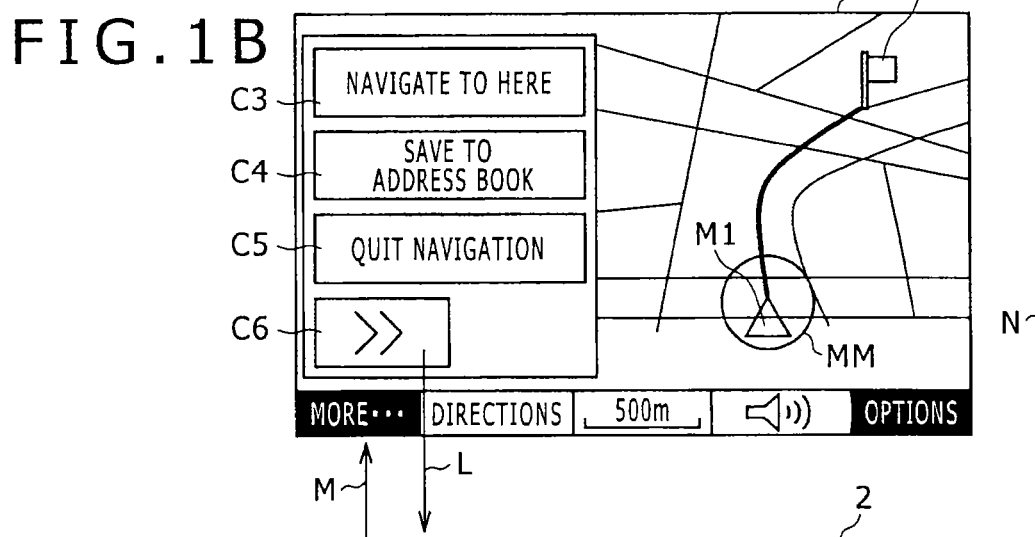
Figure 1C:
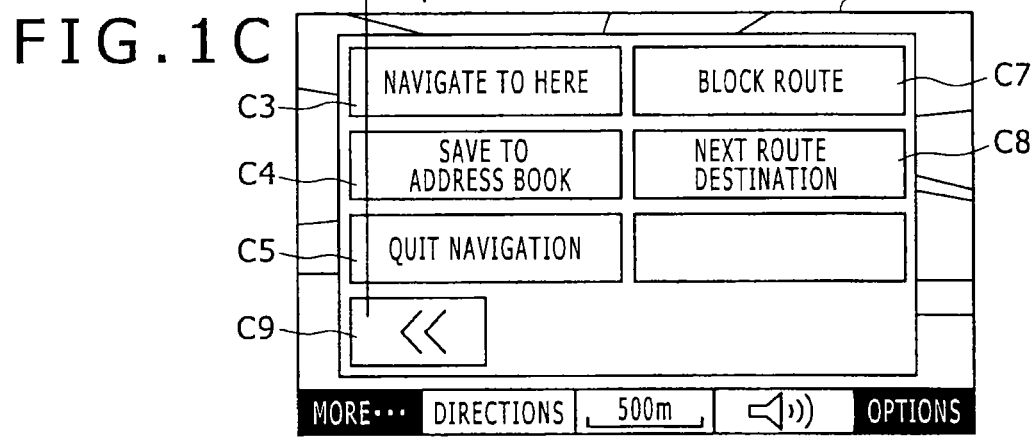

If the menu B2 is selected in the initial state, the CPU 12 displays the menus C3 through C5 of high importance and a menu C6 for opening the menus C7 and C8 of low importance in the display area except for the text display area AR1, as indicated by an arrow J in FIGS. 1A and 1B. The map display position is shifted right in such a manner that the center of the remaining area is aligned substantially with the center of the previously displayed map. If no operation is detected to be performed by the user on the touch-sensitive panel 3 with the menus C3 through C5 of high importance and the menu C6 displayed for a predetermined time period, then the CPU 12 restores the original display as indicated by an arrow K in FIGS. 1A and 1B.

By contrast, if the menu C3 is selected to accept the input of a desired destination, then the CPU 12 sets the focal position encircled by the circular mark MM to the destination, performs the route search process, and starts the route guidance process. If the menu C4 is selected to designate an entry into the address book, then the CPU 12 enters the focal position encircled by the mark MM into the address book in the same manner as when accepting destination input. If the menu C5 is selected to stop the route guidance, then the route guidance process is terminated. When the route guidance process is turned off, the menu C5 for stopping the route guidance and the menu C6 for opening the menus of low importance are grayed out and not selectable. While the route guidance process is being performed, the menu C3 for accepting destination input is grayed out and not selectable. Upon accepting an entry into the address book, the CPU 12 displays a mark pointing to the user-designated position on the map display for simplification of destination input and other operations.

When the menu C6 for opening the menus C7 and C8 of low importance is selected, the CPU 12 displays the menus C7 and C8 of low importance in addition to the menus C3 through C5 of high importance, as indicated by an arrow L in FIGS. 1B and 1C. The menu C6 for opening the menus C7 and C8 of low importance is then replaced by a menu C9 for closing the menus of low importance.

Following the display of the menus C3 through C5 and C7 through C9, the user may select the closing menu. In that case, the CPU 12 causes the original display to be restored as indicated by an arrow M in FIGS. 1B and 1C. If the menu C7 or C8 is selected, then the CPU 12 displays the corresponding menu screen through which to accept the user's designation. If no operation is detected to be carried out by the user on the touch-sensitive panel 3 for a predetermined time period, the CPU 12 restores the original display as indicated by an arrow N in FIGS. 1A through 1C.

After displaying the screen of FIG. 1B or 1C, the CPU 12 utilizes what may be called the technique of last memory to display the screen most recently displayed by operation of the menu B2 for opening other menus.

(2) Operation of the Embodiment

The navigation apparatus 1 of the above-described structure accepts input of the destination designated by the user, carries out the route search process to find the route to the destination, and performs the route guidance process up to the destination. The navigation apparatus 1 executes the route guidance process while displaying the map on the display screen 2 of the display section 13. By verifying the current position and route directions on the map, the user is able to reach the desired destination without fail (FIGS. 2 through 4B).

During the route guidance process, the display screen 2 shows the name of the current position and route directions in text form. The route directions are also given by voice, allowing the user to reach the destination confidently without looking at the map display (FIGS. 2 through 4B).

However, whereas the display of the current position name and route directions in text form allows the user to grasp reliably what is being displayed, additional indications of menus necessary for more operations would narrow the screen area available for map display and hamper the user from checking the current position and other information on the map. The added menu display would also complicate operations on the touch-sensitive panel and reduce the ease of operation for the user. Furthermore, the conveying of information to the user in text form could be potentially impeded.

Figure 8:
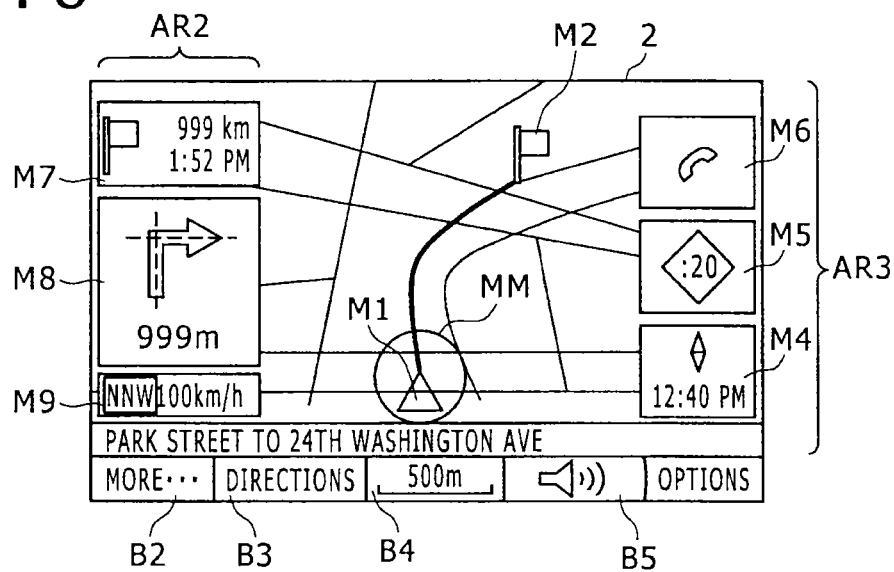
FIG. 8 is a plan view showing how text and menus are displayed concurrently.

Specifically with this embodiment, the current position name and route directions are displayed in text form along the strip-shaped area AR1 at the bottom of the display screen. If various menus were launched from the display in the area AR1 to let the text display and menu indications be juxtaposed as shown in FIG. 8 in contrast to FIG. 4, the map display area AR3 would be all the more narrowed.

In order to bypass the above bottleneck, this embodiment displays the current position name and route directions in text form along the strip-shaped area AR1 at the bottom of the display screen and, when so designated by the user, replaces the display in the area AR1 with the menu display.

In the manner described above, the embodiment effectively avoids narrowing the map display area significantly upon accepting the input of diverse operations while letting the user be informed of the current position name and route directions in text form. The visibility of map display and text indications is enhanced and the ease of operation is improved. Because the display screen 2 is streamlined in appearance, its design can be improved.

While the map of the current position is being displayed as described, selection of the menu B3 by the user may be detected (FIG. 1A). In such a case, the navigation apparatus 1 displays the most recently displayed menus based on the last memory technique (FIGS. 1B and 1C). In displaying these menus, the navigation apparatus 1 shows the menus of high importance to the left of the screen center while giving the map display in the remaining area (FIG. 1B). When the user operates the menu C6 selectively to designate a display change, the navigation apparatus 1 displays all menus (FIG. 1C). From the all-menu display, the user may operate the menu C9 selectively to designate changeover to the display of the menus of high importance and the map (FIG. 1C).

Figure 9:
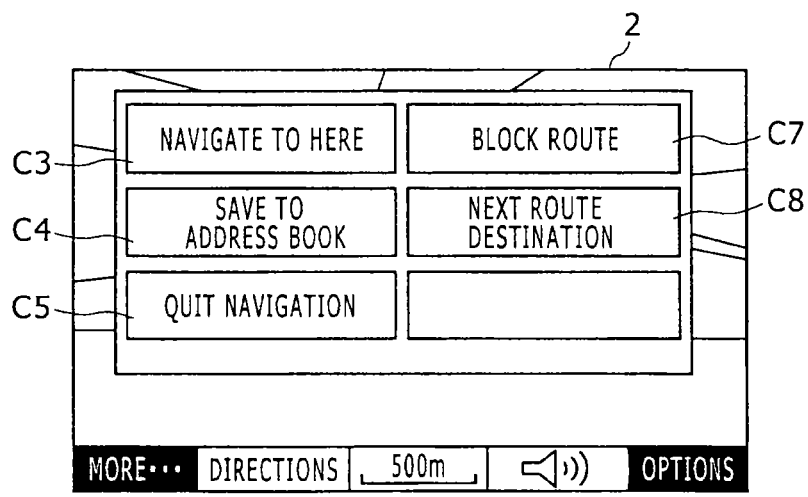
FIG. 9 is a plan view showing how numerous menus are displayed concurrently.

While displaying the menus of high importance in a manner easily operable through the touch-sensitive panel 3, the navigation apparatus 1 can still provide a sufficiently extensive map display area. If all menus are displayed in an easily operable manner through the touch-sensitive panel 3, it is difficult to allocate a sufficiently wide map display area, as indicated by the contrast between FIGS. 1A through 1C on the one hand and FIG. 9 on the other hand. In that case, it becomes difficult to input, say, the desired destination by manipulating the map.

Where all menus are displayed, each menu can be displayed in a manner easily operable through the touch-sensitive panel 3. When the display of the menus of high importance and the display of all menus are switched as needed, it is possible to display various menus in a manner operable through the map (i.e., in map-based operations).

The menus of high importance are the menus that need to be verified on the map display. More specifically, these menus include the type of menu that requires having the input of a particular destination or other settings accepted through the map. When these menus are easy to manipulate for input of necessary information through the map, the navigation apparatus 1 can improve its operability.

For example, the navigation apparatus 1 shifts the map display in the direction in which the user's fingertips slide on the map. In this manner, the user may move the marker MM to a desired position on the map and select the menu C3 for destination input. This causes the navigation apparatus 1 to establish the position encircled by the marker MM as the destination. The navigation apparatus 1 then performs the route search process to search for the route from the current position up to the established destination and starts the route guidance process.

In like manner, the user may move the marker MM to a desired position and select the menu C4 for designating an entry into the address book. This causes the navigation apparatus 1 to enter the location encircled by the marker MM into the address book. The input of the destination or other settings through the map display is thus simplified using marked positions on the map. During the input procedure, it is also possible to check nearby facilities along the route.

Where the menus of high importance and the map are displayed together, the menus of high importance are aligned on one side of the screen center while the map is displayed on the other side. The center of the previously displayed map is set to the middle of the region on the other side. This allows the user to utilize the map in approximately the same manner as the preceding map having taken up almost all the display screen. The user is expected to find this arrangement as convenient as with the full-screen map display.

The navigation apparatus 1 displays the above menus according to the last memory technique. This makes the desired menu screens available to the user in a manner emphasizing the ease of operation for the user.

(3) Effects of the Embodiment

When the present invention is embodied as described above, the display of the menus of high importance and the display of all menus are switched in response to the user's operations. This makes it possible for the user to perform map-based operations easily on diverse menus.

The menus of high importance are aligned on one side of the screen center while the map is displayed on the other side. The center of the previously displayed map is positioned in the middle of the region on the other side. This enables the user to handle the map in approximately the same manner as the preceding map that took up almost all the display screen. The user is highly likely to find this arrangement as convenient as with the full-screen map display.

Where the menus of high importance are the menus that need to have confirmations made through the map, diverse items of information can be input by manipulating the map display. This also enhances the ease of operation for the user.

For example, suppose that a given menu of high importance involves accepting the input of a desired destination from the map. In this case, the user can manipulate the map to input the destination. The procedure involved simplifies the steps in which to input the destination and thereby improves the ease of operation for the user.

Second Embodiment

Although the embodiment discussed above was shown to categorize the menu for inputting the destination as part of the menus of high importance, this is not limitative of the present invention. Alternatively, menus can be classified diversely as needed.

The above-described embodiment was shown to display the menus of high importance on the left-hand side of the screen. Alternatively, the menus of high importance may be displayed on the right-hand side, the upper side, or the lower side of the screen as desired.

Although the embodiment above was shown to change to the original display if no operation is detected on the touch-sensitive panel for a predetermined time period, this is not limitative of the present invention. Alternatively, the original display may be restored whenever needed by the user's operations.

The above embodiment was shown to be implemented when the invention is applied to the personal navigation device (PND). Alternatively, the invention may be applied to mobile phones and like devices having the navigation capability. Thus the present invention may be applied to diverse kinds of equipment, apparatuses, and devices illustratively including the PND.

It should be understood by those skilled in the art that various modifications, combinations, sub-combinations and alterations may occur depending on design requirements and other factor in so far as they are within the scope of the appended claims or the equivalents thereof.

What is claimed is:

1. A control apparatus comprising:
a control device configured to control changes in what is displayed on a display screen in response to an input from a user to a displayed area of the display screen, wherein
said control device is configured to cause said display screen to switch between displaying at least a first display state and a second display state on the display screen according to a user operation, the first display state having a first content display area on which content is displayed and the control device is configured to receive an input from the user to change a display on the display screen from the first display state to the second display state, and the second display state having a menu display area on which a menu of selectable options is displayed and a second content display area on which at least a portion of the content is displayed,
wherein in the second display state, the at least a portion of the content displayed in the second content display area is shifted from a position at which the content is displayed in the first content display area, and
wherein the control apparatus stores a plurality of selectable menu options, and the menu of selectable options displayed in the second display state displays at least one, but not all, of the plurality of selectable menu options, and the second display state further includes displaying an input area that is configured to receive an input from the user to display additional ones of the plurality of selectable menu options which are not visible in the second display state and which are different and independent from the selectable menu options which are visible in the second display state,
wherein the first display state has a first display changing input area displayed on the display screen that is configured to receive the input from the user to change the display on the display screen from the first display state to the second display state, and said first display changing input area is displayed adjacent to one of the vertical boundaries of the display screen, and said plurality of selectable menu options are vertically arranged along the one of the boundaries where the first display changing input area is located.

2. The control apparatus according to claim 1, wherein when the second display state displays the additional ones of the plurality of selectable menu options, the second display state displays an input area that is configured to receive an input from the user to hide the additional ones of the plurality of selectable menu options.

3. The control apparatus according to claim 2, wherein when the display on the display screen is in the second display state, and based on that the control device does not detect an input from the user for a predetermined time period, the control device changes the display on the display screen to the first display state.

4. The control apparatus according to claim 2, wherein when the second display state displays the additional ones of the plurality of selectable menu options, and based on that the control device does not detect an input from the user for a predetermined time period, the control device changes the display on the display screen to the first display state.

5. The control apparatus according to claim 1, wherein the content displayed on the first content display area includes location information.

6. The control apparatus according to claim 5, wherein location information is shown on an image of a map.

7. The control apparatus according to claim 6, wherein the location information shows route guidance information on the map.

8. The control apparatus according to claim 6, wherein the location information includes a name of a location.

9. The control apparatus according to claim 8, wherein the name of the location is acquired based on information received from a GPS device.

10. The control apparatus according to claim 1, wherein in the first display state the control device is configured to control the display screen to display an indicator that the control apparatus is in an area where a mobile phone function can be used.

11. The control apparatus according to claim 1, wherein the control device is configured to cause the display screen to display a menu for reproducing audio and video data.

12. A method, implemented by a control apparatus, comprising:
   changing what is displayed on a display screen in response to an input from a user to a displayed area of the display screen;
   causing said display screen to switch between displaying at least a first display state and a second display state on the display screen according to a user operation, the first display state having a first content display area on which content is displayed and receiving an input from the user to change a display on the display screen from the first display state to the second display state, and the second display state having a menu display area on which a menu of selectable options is displayed and a second content display area on which at least a portion of the content is displayed,
   wherein in the second display state, the at least a portion of the content displayed in the second content display area is shifted from a position at which the content is displayed in the first content display area,
   the method further comprising, in the menu of selectable options displayed in the second display state, displaying at least one, but not all, of a plurality of selectable menu options, and in the second display state further displaying an input area that is configured to receive an input from the user to display additional ones of the plurality of selectable menu options which are not visible in the second display state and which are different and independent from the selectable menu options which are visible in the second display state,
   wherein the first display state has a first display changing input area displayed on the display screen that is configured to receive the input from the user to change the display on the display screen from the first display state to the second display state, and said first display changing input area is displayed adjacent to one of the vertical boundaries of the display screen, and said plurality of selectable menu options are vertically arranged along the one of the boundaries where the first display changing input area is located.

13. A non-transitory computer readable medium storing a program that when executed by a control apparatus, causes the control apparatus to perform a method comprising:
   changing what is displayed on a display screen in response to an input from a user to a displayed area of the display screen;
   causing said display screen to switch between displaying at least a first display state and a second display state on the display screen according to a user operation, the first display state having a first content display area on which content is displayed and receiving an input from the user to change a display on the display screen from the first display state to the second display state, and the second display state having a menu display area on which a menu of selectable options is displayed and a second content display area on which at least a portion of the content is displayed,
   wherein in the second display state, the at least a portion of the content displayed in the second content display area is shifted from a position at which the content is displayed in the first content display area,
   the method further comprising, in the menu of selectable options displayed in the second display state, displaying at least one, but not all, of a plurality of selectable menu options, and in the second display state further displaying an input area that is configured to receive an input from the user to display additional ones of the plurality of selectable menu options which are not visible in the second display state and which are different and independent from the selectable menu options which are visible in the second display state,
   wherein the first display state has a first display changing input area displayed on the display screen that is configured to receive the input from the user to change the display on the display screen from the first display state to the second display state, and said first display changing input area is displayed adjacent to one of the vertical boundaries of the display screen, and said plurality of selectable menu options are vertically arranged along the one of the boundaries where the first display changing input area is located.

14. A display apparatus comprising:
   a display screen;
   a touch-sensitive panel installed on the display screen;
   a battery;
   a control device configured to control changes in what is displayed on a display screen in response to a touch input from a user on the touch-sensitive panel, wherein
   said control device is configured to cause said display screen to switch between displaying at least a first display state and a second display state on the display screen according to a user touch operation, the first display state having a first content display area on which content is displayed and the control device is configured to receive a touch input from the user to change a display on the display screen from the first display state to the second display state, and the second display state having a menu display area on which a menu of selectable options is displayed and a second content display area on which at least a portion of the content is displayed,
   wherein in the second display state, the at least a portion of the content displayed in the second content display area is shifted from a position at which the content is displayed in the first content display area, and
   wherein the display apparatus stores a plurality of selectable menu options, and the menu of selectable options displayed in the second display state displays at least one, but not all, of the plurality of selectable menu options, and the second display state further includes displaying an input area that is configured to receive the touch input from a user to display additional ones of the plurality of selectable menu options which are not visible in the second display state and which are different and independent from the selectable menu options which are visible in the second display state, wherein the first display state has a first display changing input area displayed on the display screen that is configured to receive the touch input from the user to change the display on the display screen from the first display state to the second display state, and said first display changing input area is displayed adjacent to one of the vertical boundaries of the display screen, and said plurality of selectable menu options are vertically arranged along the one of the boundaries where the first display changing input area is located.

15. The display apparatus according to claim 14, wherein the display apparatus is configured to connect to a cradle device and accept power from the cradle device.

16. The display apparatus according to claim 14, wherein the display screen is a Liquid Crystal Display screen.

* * * * *